United States Patent

[11] 3,596,415

[72] Inventor Irving James Donahue, Jr.
 100 Oak St., Shrewsbury, Mass. 01545
[21] Appl. No. 773,918
[22] Filed Nov. 6, 1968
[45] Patented Aug. 3, 1971

[54] GRINDING WHEEL HUB ASSEMBLY
 13 Claims, 12 Drawing Figs.
[52] U.S. Cl. .................................................. 51/378
[51] Int. Cl. ............................................. B24d 17/00
[50] Field of Search ........................................ 51/358, 376—379

[56] References Cited
 UNITED STATES PATENTS
 3,041,797 7/1962 Moffly ........................ 51/378
 3,136,100 6/1964 Robertson ................. 51/378 X
 3,166,877 1/1965 Reames ..................... 51/378
 3,418,869 12/1968 Herpich .................. 151/41.73 X Primary Examiner—Othell M. Simpson
Attorney—Robert T. Dunn ABSTRACT: An abrasive grinding disk hub assembly for mounting the disk on a spindle is made up of a nut member which is inserted through a clearance hole in the disk up to a shoulder on the nut and into a socket in a dish-shaped mounting flange on the other side of the disk. When mounted, the nut threads to the spindle which shoulders against a lip on the flange and so as the nut is screwed onto the spindle, the flange acts as a disk spring squeezing the grinding disk between the nut and the flange and a spindle shoulder distorts the lip, tending to lock the nut on the spindle. The nut is of substantially harder material than the flange and may have ridges which cut into the flange socket, thereby fixing the nut in the socket so that it cannot rotate relative thereto.

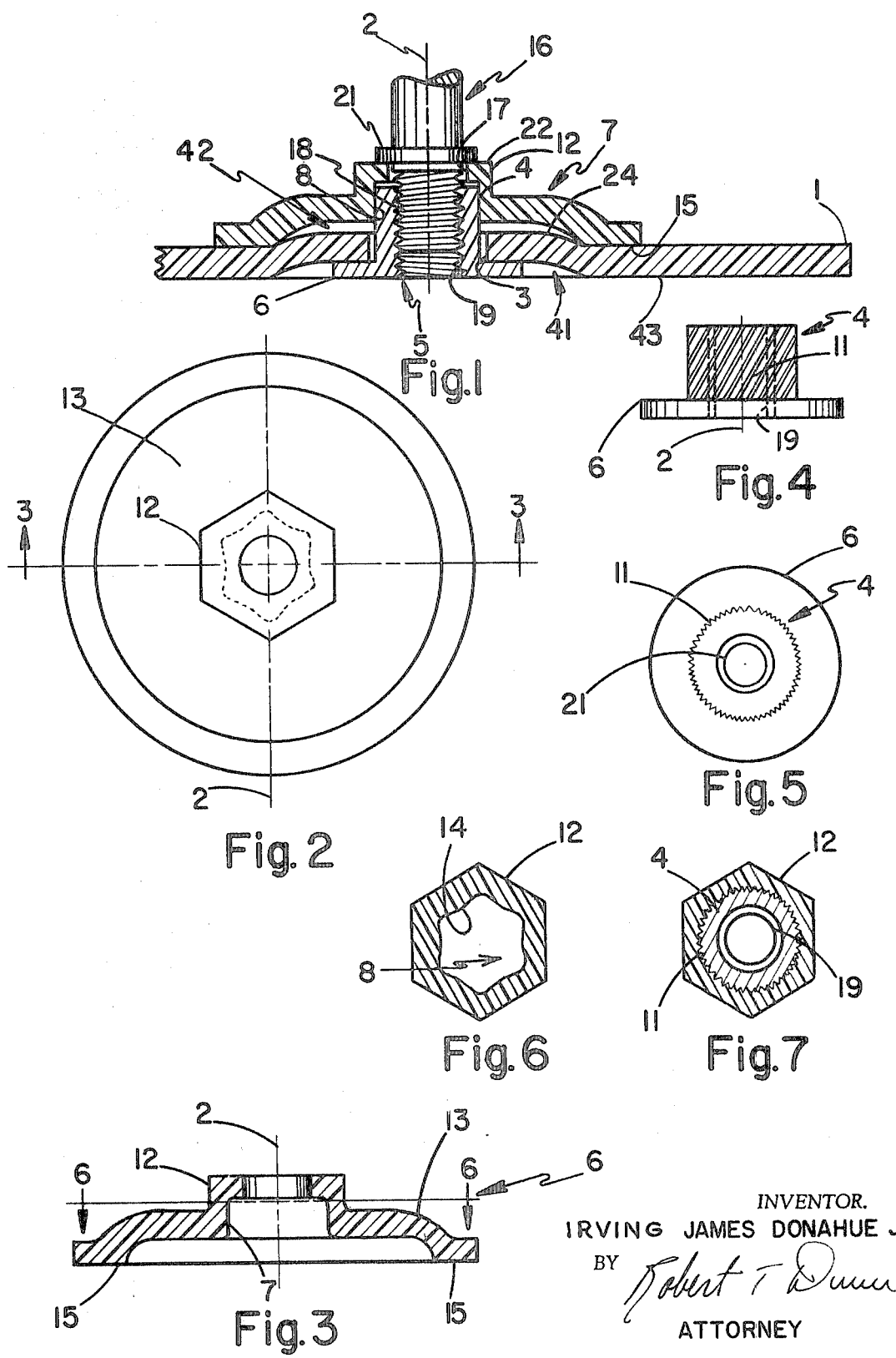

PATENTED AUG 3 1971

INVENTOR.
IRVING JAMES DONAHUE JR.
BY Robert T Dunn
ATTORNEY

GRINDING WHEEL HUB ASSEMBLY

This invention relates to grinding wheels and more particularly to a hub assembly for a grinding wheel by which the wheel is securely fastened to a spindle and which is relatively inexpensive and intended to be thrown away with the wheel.

Heretofore, one type of throwaway hub assembly for mounting a grinding wheel to a spindle has included a nut on one side of the grinding wheel or grinding disk, a flange on the other side of the disk and an opening in the flange and the disk whereby the spindle can be secured to the nut and shoulders against the flange so that when the nut is screwed onto the spindle, the nut and flange squeeze the disk in between, thereby fastening the disk to the spindle. In one type assembly of this sort, a portion of the nut projects through a clearance hole in the disk and into a socket in the flange so that a snug fit is provided between the portion of the nut and the socket which engage. As a rule the flange and the nut are made of zinc diecasting or steel, and it is often necessary to use an adhesive-type bedding material between the flange and the disk and between the nut and the disk. The bedding material fills in voids and when it hardens, fixes the alignment of the spindle with the plane of the disk and with the center of the disk. Quite clearly, this bedding material is an adhesive which bonds both the nut and the flange to the disk and the fit between the nut and the socket in the flange serves no purpose other than to align the nut with the flange so that they are concentric.

It is one object of the present invention to provide such a hub assembly in which the nut is secured directly to the flange, so constructed that the nut and flange are not only aligned concentrically, but one cannot rotate with respect to the other.

It is another object of the present invention to provide such a hub assembly of relatively inexpensive material by which satisfactory alignment of the spindle with the disk is achieved with or without requiring the use of the bedding or adhesive material.

It is another object of the present invention to provide a simple relatively inexpensive assembly for a grinding wheel disk hub, at least some of the parts of which are so altered at assembly that they cannot be easily disassembled and used again.

It is another object of the present invention to provide a hub assembly for mounting a grinding wheel disk on a spindle including at least some parts made of plastic.

It is another object to provide a hub assembly including a nut and flange with the grinding disk in between for threadable connection to a shaft, such as described above, and in which the flange is so constructed that it is loaded as a spring when assembled and mounted on the spindle, thereby holding the disk between the flange and nut under the spring force.

It is another object of the present invention to provide such a hub assembly on which the flange is made of relatively soft inexpensive moldable material (such as plastic) and the nut is so designed to fixedly fit thereto at assembly with the disk in between.

In the present invention, the nut is made of substantially harder material than the flange and the portion of the nut which fits into the central socket in the flange is ridged with generally longitudinally running ridges that cut into the walls of the flange socket at assembly, thus fixing the nut to the flange so that one cannot rotate relative to the other. In one embodiment, the nut is made in a single unitary piece including a shoulder or flange with a boss rising from the shoulder flange. At assembly, the boss is inserted through a clearance hole at the center of the disk and into the socket in the mounting flange on the other side of the disk until the nut shoulder bears on the disk around the clearance hole. When the assembly is mounted on the spindle, the spindle is inserted through the mounting flange and screws into the nut, a shoulder on the spindle abuts the mounting flange pulling the nut boss further into the mounting flange socket and squeezing the grinding disk between the mounting flange and nut shoulder.

Embodiments of the invention described herein include a mounting flange made of plastic and a nut made of metal. The mounting flange can be easily molded to the proper dimensions at relatively low cost and the nut can be machined from round stock of no greater diameter than the diameter of the nut shoulder flange. In another embodiment, the nut is formed in two parts, a washer and a center part which forms the nut boss and which is threaded to accommodate the spindle and on which the ridges are cut on the outside. This center part of the nut can be machined from round stock only slightly larger in diameter than the center part of the nut which when assembled with the washer forms a nut with a shoulder flange substantially larger in diameter than the stock from which the center part of the nut is machined. By this structure, the cost of manufacturing a nut having a relatively large shoulder flange is substantially reduced.

When the nut is formed in two parts, (the washer and the center part), it is expedient to mount the washer on the center part over a set of ridges which cut into the washer and so the washer is forced fit to the center part. A lip formed on the end of the center part of diameter slightly larger than the washer opening, retains the washer on the center part when the nut is assembled and the assembly is mounted by screwing the nut onto the spindle which pulls the washer against the grinding disk. By this construction, the stock from which the center part of the nut is machined is only of slightly larger diameter than the center part and the washer attached to this may be of any diameter desired without appreciably altering the cost of the complete nut.

The mounting flange is dish shaped or so designed that substantially only the outer periphery of the flange bears against the grinding disk before assembly. At assembly, when the nut is forced against the disk and into the mounting flange socket, the outer periphery of the mounting flange flexes toward the flange boss. Thus, the mounting flange is spring loaded when assembled and acts as a dish spring. In addition, when the mounting flange is made of plastic, the portion of the flange which defines the socket and the portion against the spindle shoulder is squeezed as the assembly is mounted on the spindle and deformed slightly. This slight deformation of the plastic mounting flange by virtue of the resilience of the plastic material serves to further lock the spindle to the nut somewhat as a lockwasher.

Misalignment of the disk with the spindle can occur due to surface irregularities over the grinding disk where these irregularities contact the mounting flange. A given irregularity which contacts the mounting flange close to the axis of the spindle is inclined to tilt the disk off axis or out of axial alignment with the spindle a great deal more than the same irregularity contacting the mounting flange a greater distance from the spindle axis. When the mounting flange is made of relatively soft plastic material as in an embodiment of the present invention, these surface irregularities dig into the plastic mounting flange when the assembly is mounted on the spindle. Thus, the irregularities are less inclined to tilt the disk off axis.

Accordingly, it is an object of the present invention to provide a relatively inexpensive throwaway hub assembly for mounting a grinding disk to a spindle which can be quickly assembled with positive engagement between a nut, a mounting flange and the spindle, with spring loading effects against the disk and which does not require the use of bedding material to insure proper alignment of the disk with the spindle.

Other objects and features of the invention will be apparent from the following specific description of embodiments of the invention taken in conjunction with the figures in which:

FIG. 1 is a cross-sectional view of an embodiment showing the assembly, the section taken through the spindle axis;

FIG. 2 is a top view of the mounting flange;

FIG. 3 is a cross-sectional edge view of the mounting flange;

FIG. 4 is an edge view of one embodiment of the nut;

FIG. 5 is a top view of the same embodiment;

FIGS. 6 and 7 are top cross-sectional views of a portion of the mounting flange socket showing the shape of the socket before and after assembly with the nut, respectively;

Figure 8:
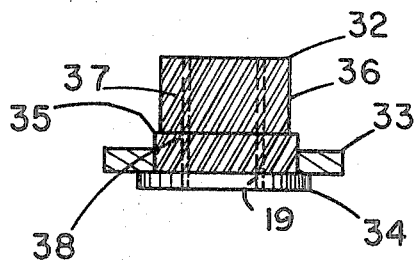
FIG. 8 is a partially sectioned edge view of another embodiment of the nut formed in two parts.

The cross-sectional view shown in FIG. 1 illustrates the assembly of the grinding disk 1 which is usually circular and concentric with the axis 2. A central aperture 3 in the grinding wheel disk permits passage of the boss portion 4 of a nut 5 which includes a shoulder flange 6 at one end that bears against the one side of the disk 1 adjacent the central opening 3. The boss 4 projects through the opening 3 and into the mounting flange 7. For this purpose, a socket 8 is formed centrally in the mounting flange making a force fit with the nut boss 4.

Details of the nut 5 are shown in FIGS. 4 and 5 and details of the mounting flange 7 are shown in FIGS. 2 and 3. Quite clearly, the nut 5 is generally a figure of revolution about the axis 2 except for the ridges 11 on the outside of the boss portion 4 of the nut. The mounting flange 7 is also a figure of revolution about the axis 2 except for the hexagonal-shaped boss 12 (which rises from the flange portion 13 of the mounting flange) and except for the shape of the socket 8 formed in the mounting flange.

At assembly, shown in FIG. 1, the boss portion 4 of the nut 5 is inserted through the opening 3 at the center of the grinding disk and is forced into the socket 8 in the mounting flange 7. The inside walls of the socket 8 contain protuberances 14 into which the nut ridges 11 cut, when the nut is forced into the socket. For this purpose, the nut is made of material which is a great deal harder than the material of which the flange is made. More particularly, the boss 4 of the nut 5 may be made of steel and the mounting flange 7 may be made of plastic. One suitable plastic is styrene, however others may be employed or a relatively soft metal or metal alloy may be employed.

At assembly, the shoulder flange 6 of the nut abuts one side of the disk 1 and a flat ring-shaped area 15 at the periphery of the mounting flange 7 first contacts the other side of the disk. When the nut boss is inserted into the flange socket, the outer periphery 15 of the flange bends toward the flange hex boss 12. This bending produces a spring-loading effect which tends to maintain a tight squeeze on the disk 1 sandwiched between the mounting flange 7 and the shoulder flange 6 of the nut. This allows the assembly to be mounted on the spindle and rotated to screw on the nut, without slippage between the nut, the disk and the mounting flange.

Thereafter when the assembly is mounted on the spindle, the spindle 16 is inserted through a coaxial opening 17 in the hex boss 12 of the mounting flange 7 and the threaded end 18 of the spindle is screwed into accommodating threads 19 on the inside of the nut boss 4. A shoulder 21 on the spindle shaft abuts the top of the hex boss 12 and so as the spindle is screwed into the nut, the nut boss 4 is pulled further into the socket 8 and the lip 22 on the hex boss 12 is pressed by the shoulder toward the nut. Thus, when the assembly is mounted, the lip 22 is distorted, and since it is made of plastic, and is therefore resilient, it acts as a lockwasher between the shoulder and the end of the nut boss 4.

During the course of assembling the parts and mounting on the spindle, irregularities on the surface of the disk tend to imbed into the plastic mounting flange where it contacts the disk and so misalignment of the disk axis is avoided. In this respect, the mounting flange of relatively soft material functions somewhat as the bedding material used in the prior art.

The ridges 11 on the boss 4 of the nut may be formed by cutting grooves side by side around the circumference of the boss. These grooves may run parallel to the axis 2 or at an angle as shown in FIG. 4 so that each groove and each ridge 11 defines a portion of a helix running from the end to the base of the boss. When the grooves are cut at an angle as shown in FIG. 4, the angle is preferably such that any tendency of the nut to rotate relative to the flange during operation of the assembly will tend to pull the nut into the flange socket in the fashion of a screw thread.

FIG. 6 shows a cross-sectional view of the hex boss 12 of the mounting flange illustrating the inside shape of the socket 8 before a nut is forced into the socket. FIG. 7 shows the nut boss 4 forced into the socket with the ridges 11 biting particularly into the protuberances 14 on the inside of the socket.

The nut 5 shown in detail on FIGS. 4 and 5, is formed in a single unitary piece which may be machined from round stock of the same diameter as the diameter of the shoulder flange 6. This requires removal of a considerable amount of material in order to form a sufficiently wide shoulder flange with the boss rising from it, even before the ridges 11 are machined on the boss. This problem is avoided to some extent with the nut shown in FIGS. 8 and 9 and shown assembled with the flange 7, disk 1 and spindle 16 in FIG. 10.

Figure 9:
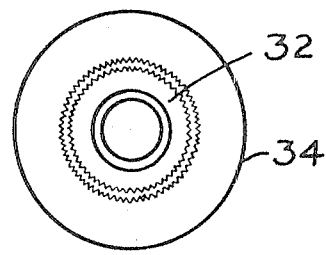
FIG. 9 is a top view of the nut formed in two parts.
Figure 10:
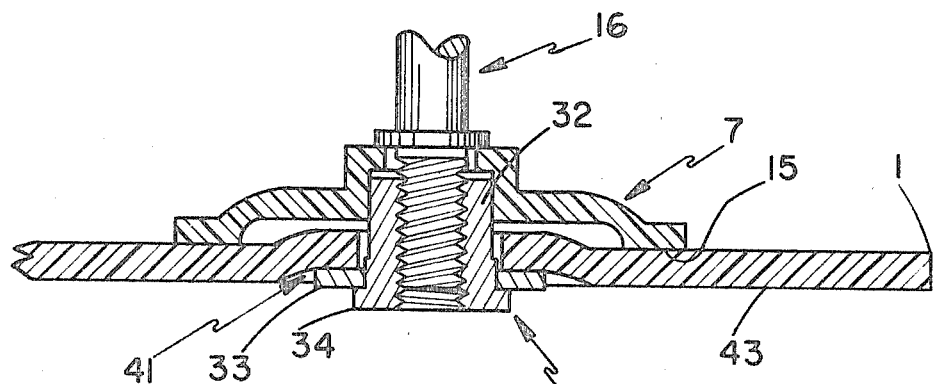
FIG. 10 is a cross-sectional view of the hub assembly including the nut shown in FIGS. 8 and 9.

The nut 31 shown in FIGS. 8 and 9 and in the assembly in FIG. 10 is made in two separate parts, a central part 32 which defines the boss and a washer 33 which defines the flange. The central part 32 has a lip 34 at one end which holds the washer 33. The boss portion is formed with two steps. The step 35 is of slightly larger diameter than the step 36 and both steps are grooved to form ridges. The ridges 37 in the step 36 are provided for the same purpose as the grooves 11 on the boss of the nut shown in FIGS. 4 and 5. The grooves 38 on the step 35 are designed so that the step 35 force fits into the washer 33. The intention of the step in the center part 32 is so that the washer will fit easily over the ridges 37 and must be forced onto the ridges 38 and so the washer 33 is formly held by the force fit over the ridges 38 which cut into the inside of the washer. By this construction, the washer 33 is assembled to the center part 32. The nut is then ready for assembly with the grinding disk 1 and mounting flange 7 and so that the assembly can be mounted on the spindle 16 as shown in FIG. 10.

Turning again to FIGS. 1 and 10, the center part of the disk 1 is formed with a depression 41 on one side against which the flange of the nut abuts and with a protuberance 42 on the other side generally enclosed by the mounting flange 7. The purpose of the depression 41 is to make the nut flange 6 flush with the grinding surface 43 of the disk and so the depression 41 is sufficiently deep to accomplish this as shown in FIG. 1. The flush feature is more difficult to achieve with the nut 31 shown assembled in FIG. 10 and might require a deeper depression than when using the nut shown in FIGS. 4 and 5 because the lip 34 which retains the washer 33 and which is formed by machining the center portion 32 of the nut from a piece of round stock, protrudes beyond surface 43.

Figure 11:
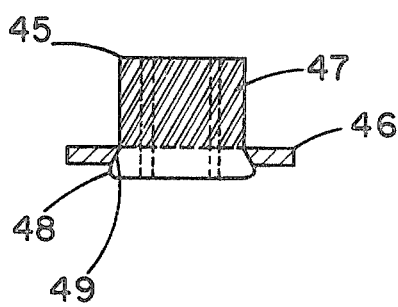
FIGS. 11 and 12 are edge and top views of a third embodiment of the nut formed in two parts.
Figure 12:
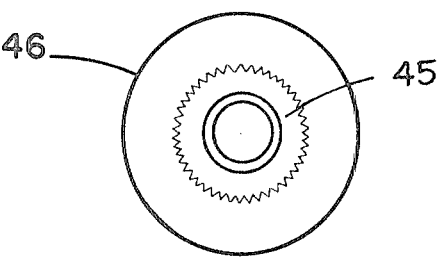

This problem is somewhat avoided by constructing the nut as illustrated in FIGS. 11 and 12. Here again, the nut is formed in two parts, a center part 45 and a washer 46. The center part which defines the nut boss contains ridges 47 which may be identical to the ridges 11 on the nut in FIG. 4 and is forged or machined to provide a beveled lip 48 at one end for retaining the washer. The washer 46 preferably has an accommodating bevel 49 and may be dimensioned to fit over the grooves 47 without forcing until it abuts the beveled lip 48 as shown in FIG. 11 and then welded or swaged in position. The washer may also be dimensioned to fit forcibly over the ridges 47 which will cut into the inside of the washer as it is forced over the ridges down to the lip 48.

The nut shown in FIGS. 11 and 12 can be made with as large a diameter washer as desired and the center portion 45 can be formed with round stock only slightly larger than the diameter of the boss portion of the nut and so the nut can be formed relatively inexpensively. At the same time, this nut can be made to fit substantially flush with the undersurface 43 of the disk 1 more readily than the nut shown in FIGS. 8 and 9.

The hub assembly including a mounting flange molded of plastic and a nut made of metal such as steel can be produced at relatively low cost and is intended to be thrown away with the wornout grinding disk. Quite clearly, many of the features of the invention can be achieved employing a mounting flange made of relatively soft metal into which the ridges on the nut boss will cut when the nut and flange are assembled with a grinding disk. For some applications, the preferred embodiment of the present invention employs a mounting flange constructed as described and of plastic material such as styrene. The plastic mounting flange can be molded to meet relatively high dimensional tolerances and at relatively lower cost than a forged, stamped or die-cast metal flange. Thus, the many features of the present invention provide an economical hub assembly for mounting a grinding disk on a spindle which can be quickly mounted on the spindle by an operator in the field as it does not require the use of adhesives, bedding material or special wrenches.

Quite clearly, numerous modifications to the embodiments described herein can be made which are within the state of the art without deviating from the spirit and scope of the invention as set forth in the accompanying claims.

What I claim is:

1. In an abrasive grinding disk hub assembly, means for mounting the disk on a spindle which has a threaded end extending from a shoulder on an axis transverse to the plane of the disk, the disk having a nut clearance hole at the center concentric with said axis, comprising:
   a nut member including a concentric shoulder flange and boss adapted for insertion through the clearance hole from one side of the disk up to the nut flange, and threadably engaging the spindle end
   a dish-shaped mounting flange on the other side on the grinding disk engaging the disk at substantially only the periphery of the flange as a disk spring and including a clearance hole for the spindle to pass through the mounting flange from one side and engage the nut, and a socket into which the nut boss fits from the other side of the mounting flange, the clearance hole and socket in the flange defining a lip which is deformed at assembly tending to lock the nut on the spindle
   the nut boss and the spindle being made of substantially harder material than the inside of the socket.

2. In an abrasive grinding disk hub assembly as in claim 1 and in which,
   the nut is made of metal and
   the mounting flange is made of plastic.

3. In an abrasive grinding disk hub assembly as in claim 1 and in which,
   the disk has a depression on the one side concentric with the nut clearance hole and
   the nut flange fits into the depression.

4. In an abrasive grinding disk hub assembly, means for mounting the disk as in claim 1 and in which the nut boss has ridges on the outside thereof which are of substantially harder material than the inside of the socket, so that when the boss is forced into the socket at assembly the ridges cut into the walls of the socket, fastening the nut and mounting flange together with the grinding disk in between.

5. In an abrasive grinding disk hub assembly as in claim 4 and in which,
   the ridges on the nut boss curve around the axis thereof.

6. In an abrasive grinding disk hub assembly as in claim 4 and in which,
   the inside of the socket contains raised portions into which the nut boss ridges cut.

7. In an abrasive grinding disk hub assembly as in claim 5 and in which,
   the inside of the socket contains raised portions into which the nut boss ridges cut.

8. In an abrasive grinding disk hub assembly as in claim 1 and in which,
   the ridges are helical and side by side and each ridge extends from one end of the nut boss substantially to the nut shoulder flange.

9. In an abrasive grinding disk hub assembly as in claim 8 and in which,
   the inside of the socket is substantially hex shaped,
   whereby the nut boss ridges cut into the socket hex faces.

10. In an abrasive grinding disk hub assembly for mounting a grinding disk on a threaded spindle, including a mounting flange on one side of the disk, a central clearance hole for the threaded end of the spindle opening into a socket in the mounting flange, the clearance hole and socket being concentric with a central hole in the disk, a nut for threadably engaging the spindle from the other side of the disk to hold the assembly on the spindle comprising,
    a nut boss and nut flange such that the boss passes through the central hole in the disk and fits forcibly into the mounting flange socket and the nut flange abuts the said other side of the disk,
    the nut flange being a washer which forcibly fits onto one end of a cylinder, threaded on the inside, which defines the nut boss.

11. In an abrasive grinding disk hub assembly as in claim 10 and in which,
    one end of the nut boss has ridges on the outside which cut into the washer opening which forcibly fits thereto.

12. In an abrasive grinding disk hub assembly as in claim 11 and in which,
    the washer fits easily over the nut boss ridges which cut into the flange socket and forcibly over the ridges which cut into the washer opening.

13. In an abrasive grinding disk hub assembly as in claim 10 and in which,
    the nut cylinder has a beveled lip at one end,
    the inside of the washer is beveled and
    the beveled lip and washer bevel fit together retaining the washer at one end of the nut cylinder.